June 23, 1964 R. E. BURKET ETAL 3,138,494

METHOD OF ANNEALING MAGNETIC MATERIALS

Filed May 1, 1961 3 Sheets-Sheet 1

METHOD OF ANNEALING MAGNETIC MATERIALS 3,138,494

METHOD OF ANNEALING MAGNETIC MATERIALS

Robert E. Burket, Brackenridge, and Donald M. Stewart, Tarentum, Pa., assignors to Allegheny Ludlum Steel Corporation, Brackenridge, Pa., a corporation of Pennsylvania Filed May 1, 1961, Ser. No. 106,780
7 Claims. (Cl. 148—103)

Figure 1:
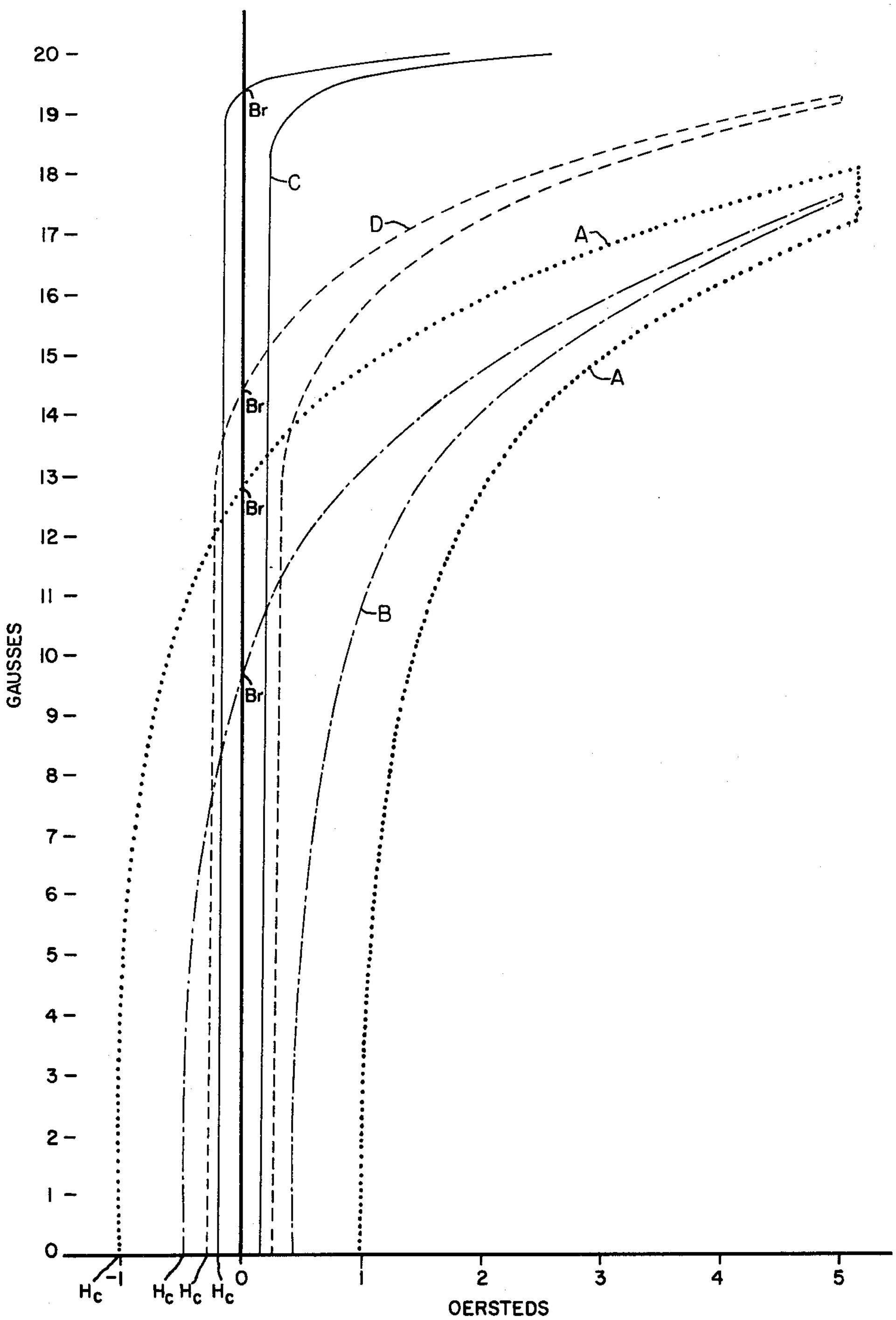

This invention relates to improvements obtainable in magnetic materials by a novel technique in annealing, and relates in particular to a method of effecting a magnetic anneal on soft magnetic core materials.

It is a well-established fact that for certain soft magnetic materials, annealing in the presence of an externally applied magnetic field can cause improvements in certain of their magnetic properties. Such treatment is generally referred to as "magnetic annealing" and the effects of such a treatment are to superpose on the material an extra or induced magnetic anisotropy uniaxially so that subsequent magnetization is easy in the forward and reverse directions along this axis, but is increasingly difficult at increasing angles from the axis. The materials in service are magnetized along their axes to take advantage of the improved magnetic properties. Magnetic annealing is not effective for all soft magnetic materials and is known to be useful only for the treatment of binary and ternary alloys of the three ferromagnetic elements iron, nickel and cobalt, and some of the silicon-iron compositions.

One example of magnetic annealing is the beneficial effect obtained by annealing an alloy known as Supermendur (49% Fe, 49% Co, 2% V), in the presence of an externally applied magnetic field. It is well known that this material, after being processed in a standard manner and final annealed in the presence of an externally applied magnetic field under ultrapure atmosphere conditions, exhibits remarkable improvements in its hysteresis loop characteristics. Such characteristics include a low coercive force (low $H_c$), a low hysteresis loss, a high maximum permeability (high $\mu$ max.), a high permeability associated with a high flux density, a high remanence ($B_r$) and a rectangular hysteresis loop with a high flux swing from minus remanence to plus saturation. Similar magnetic properties in varying degrees are obtainable by magnetic annealing the other iron-nickel, iron-silicon, iron-cobalt and iron-cobalt-nickel soft magnetic materials.

The above-enumerated magnetic properties are those desired and required for wound cores such as are employed in magnetic amplifiers and in instrument and distribution transformers. In such applications a magnetic material that exhibits a substantially rectangular hysteresis loop of the type effected by the above-enumerated properties is ideal for the application required. These materials and their application in the field of magnetic materials are well known and will be obvious to one skilled in the art of producing soft magnetic materials.

The techniques involved in magnetic annealing of the Fe-Co-V systems are equally applicable to all soft magnetic materials that are amenable to magnetic annealing. The method of the present invention is particularly applicable to any such materials which may be treated in a manner to effect a high residual induction after being magnetized.

To conduct magnetic annealing, one must possess special equipment that is capable of annealing the material at temperatures in excess of about 1200° F. while simultaneously supplying a suitable magnetic field. The techniques currently employed are well known to one skilled in the art. All of the known methods being used, however, do involve magnetizing the material while it is being annealed. It obviously would be far more convenient and economical to be able to produce the effect of a magnetic field separately from the annealing treatment. The equipment required to magnetize such core materials as punched EI and EE laminations would be relatively simple if the magnetic field did not have to be applied while the laminated structures were in a furnace at high temperatures.

It has now been found by applying the method of the present invention magnetic materials such as wound cores or stacked laminations may be treated in a manner to effect good magnetic properties without applying an externally created magnetic field during heat treatment.

In general, the present invention is a method wherein magnetic materials are subjected to a magnetic field outside any specific heating zone in such a manner as to have a residual induction such as is ordinarily associated with hard magnetic materials, and are then annealed at a temperature best suited for magnetic annealing so that the lasting or residual induction acts in a manner similar to that ordinarily applied by means of an external source during heat treatment, and in consequence causes the material to be magnetically annealed to some extent and to exhibit superior magnetic characteristics to those commonly shown by alloys which have been subjected to annealing alone. The invention is also directed to a method whereby soft magnetic materials are annealed at a temperature which will effect the magnetic properties of high coercive force coupled with high residual induction and are then left at remanence after applying an externally applied magnetic field at substantially room temperature outside any heating zone, and are then subsequently annealed at a temperature below the Curie temperature which will effect the best magnetic properties during ordinary magnetic annealing.

It is therefore an object of the present invention to provide a method of magnetic annealing of iron-nickel, iron-silicon, iron-cobalt and iron-cobalt-nickel soft magnetic materials in a manner whereby a magnetic field from an external source need not be applied during heat treatment to obtain effects approaching those normally obtained by applying an external field during heat treatment.

It is also an object of the present invention to provide a method wherein high residual magnetism is induced into soft magnetic materials which are subsequently heat treated to effect improved magnetic properties.

It is a further object of the present invention to subject soft magnetic materials to a condition wherein they are susceptible to acquiring a substantially high residual magnetism, subjecting the so-treated materials to a magnetic field so as to induce such residual magnetism, and annealing said materials within a temperature range that will effect maximum magnetic properties.

Other objects and advantageous features of the present invention will be obvious from the specification and drawings wherein:

FIGURE 1 consists of superimposed diagrammatic plots of direct current hysteresis loops, such as are familiar to those skilled in the art of magnetic materials. The diagram represents the upper half of the loops only, which are direct plots of the data given to illustrate the present invention in each of Tables I, III, IV and VI. The loop A represents a plot of the test results of the magnetic properties of the third example in Table I; loop B is a plot of the test results of the first example set forth in Table III; loop C is a plot of the test results of the second example in Table IV and loop D is a plot of the test results of the third example in Table VI.

Figure 2:
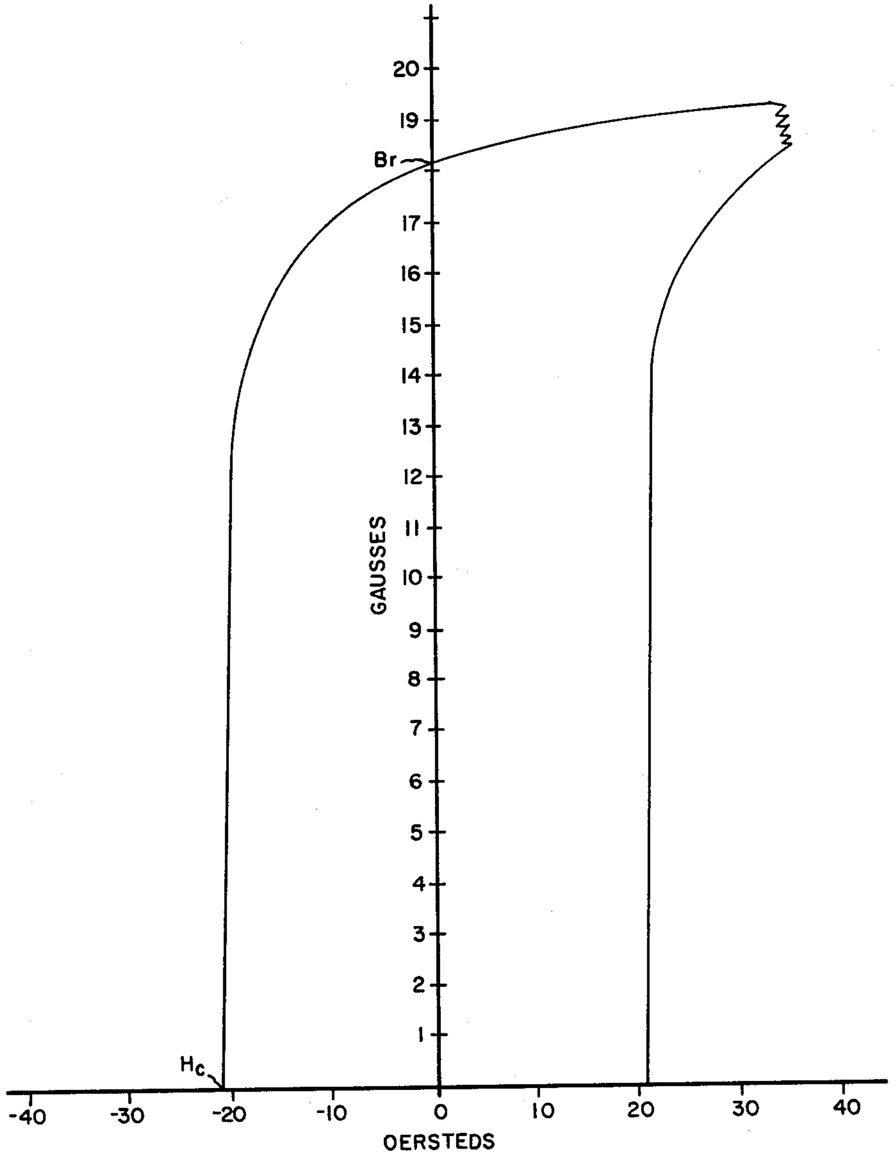
Figure 3:
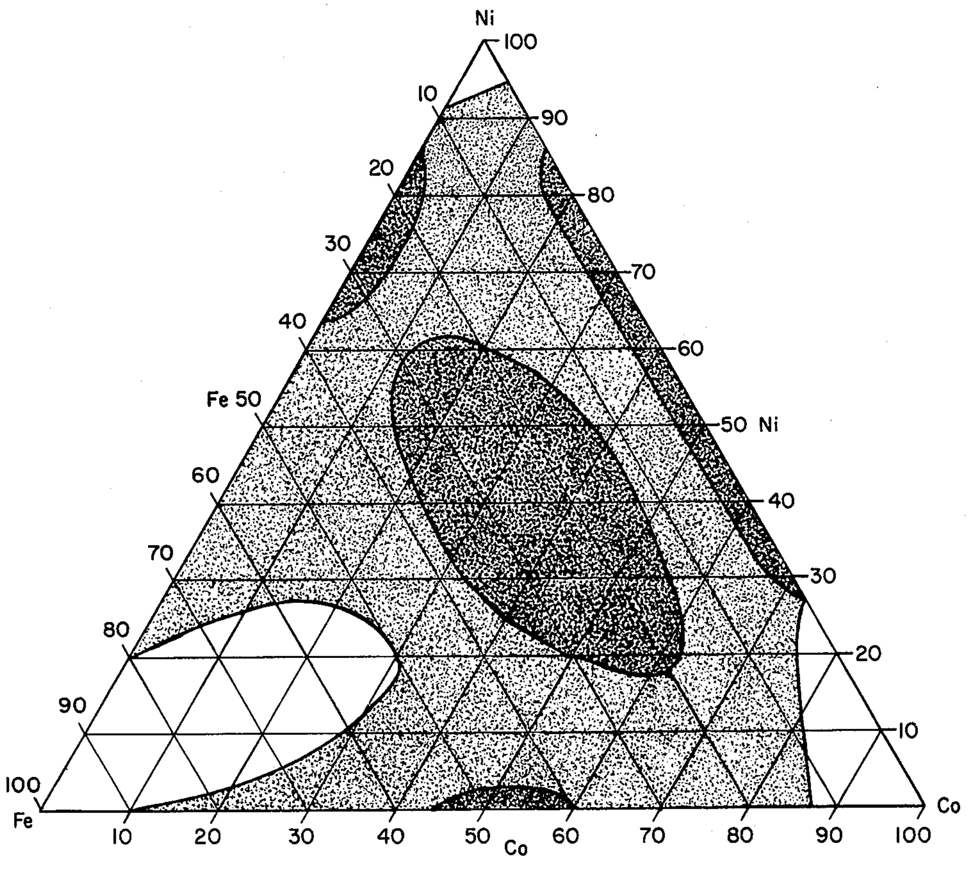

FIG. 2 is a plot of the direct current hysteresis loop of the first example of the data given by Table V which has been annealed to effect a material of high residual magnetism, and FIG. 3 is a triaxial diagram on which are plotted the compositions of binary and ternary iron-nickel-cobalt alloys, the shaded areas of the diagram representing the binary and ternary compositions that are known to respond to magnetic annealing.

Magnetic alloys are generally regarded as "soft" magnetic materials such as are subject to the treatment of the method of the present invention, or "hard" such as are illustrated by the permanent magnet materials. The difference in properties of these two materials is in their respective magnetic characteristics when subject to an induced magnetic field or flux. When the flux-inducing electrical current is stopped, the induced magnetic field of soft magnetic materials substantially (though not entirely) collapses, while the induced field of the hard magnetic materials remains largely intact so as to effect substantially permanent magnetism. The amount or degree of residual magnetism ($B_r$) that remains in soft magnetic materials after the removal of the induced flux, and the amount of field in a reverse direction required to overcome the residual magnetism ($H_c$), as well as other magnetic characteristics, vary in accordance with the physical and structural condition of the magnetic material. For example, loop A of FIG. 1 shows the first and second quadrants of the hysteresis loop of a 2% V, 49% Co, 49% Fe alloy, known as 2V Permendur, that has been annealed at 1385° F. and rapidly cooled. This diagram represents the magnetic flux density (B) as measured in gausses plotted against the magnetizing force (H) as measured in oersteds. The techniques employed in obtaining this loop and the interpretation of the $B_r$ and $H_c$ are well known to one skilled in the art.

A material is said to have a square hysteresis loop if it exhibits a high ratio of residual induction ($B_r$) to maximum induction ($B_m$). However, even a visual examination of the loop A of FIG. 1 or the data of Table I from which this diagram was derived, will show the material does not have a rectangular loop, and also that it has a relatively high coercive force ($H_c$) and, as previously shown for soft magnetic materials, a rectangular hysteresis loop coupled with a low coercive force is one of the goals of magnetic annealing.

Heat treatment of the Fe-Co-V alloy at temperatures of from about 1450° F. to 1600° F. vastly improves the magnetic properties of the alloy insofar as the $H_c$ and $\mu$ maximum are concerned, but it impairs the rectangularity of the hysteresis loop as illustrated by loop B of FIG. 1 and the data of Table III.

The hysteresis loop C of FIG. 1 and the data of Table IV illustrate some of the best properties available from such material after regular magnetic annealing in the conventional fashion.

These data illustrate that annealing in the presence of an externally applied magnetic field can improve the rectangular characteristics of the hysteresis loop and can cause a remarkable improvement in the D.C. (direct current) coercive force (4 to 5 times lower). Thus, for this alloy, a low energy, rectangular hysteresis loop is obtained by annealing in the presence of an externally applied field.

This same alloy, the nominal 49% Fe, 49% Co, 2% V alloy, can also be annealed to develop a high energy, high coercive force, high $B_r$ hysteresis loop suitable for use in self-biasing, magnetostriction type transducers as illustrated by the data in Table V. Thus, the material exhibits a high energy rectangular hysteresis loop with high $B_r$, high $H_c$ and low $\mu$ max. These properties are illustrated by the hysteresis loop shown by FIG. 2 and the data shown in Table V.

In the method of the present invention, advantage is taken of the properties of the material illustrated by FIG. 2. The high $B_r$ and high $H_c$ are utilized to effect the magnetic anneal without the application of a flux from an exterior source during treatment. The material annealed at 1022° F. was magnetized (at room temperature) and left at $B_r$, and then reannealed at 1350° F. to 1550° F. and slow cooled. The resultant properties as shown by the hysteresis loop D of FIG. 1 and the data shown by Table VI. As will be observed by an examination of the figure and the data, the effects of magnetic annealing are apparent since the high $B_r/B_m$ ratio or squareness of the hysteresis loop are apparent and the coercive force ($H_c$) is low. The properties shown by loop D of FIG. 1 and Table VI are shown to be better than any obtainable by ordinary heat treatment methods, and although these properties are not as good as those obtained by conventional magnetic annealing, they substantially approach the level of such properties, and since this practice eliminates the cumbersome necessity of effecting a magnetic field in an annealing furnace, the present method affords a significant advance in the field of magnetic annealing.

The method of the present invention is not limited to materials susceptible to acquiring the hysteresis loop of FIG. 2 in that residual magnetism left in any of the Fe-Co, Fe-Co-V, Fe-Ni and Fe-Ni-Co systems, regardless of how slight, will improve the magnetic properties of the heat treated material to some degree. In addition, as will be shown by the data of Table VII, unannealed, as-cold-rolled specimens of the same material were subjected to a relatively high magnetizing force, left at remanence and annealed. The results show clearly that highly stressed material may be subjected to a high magnetizing force to effect residual magnetism that will significantly improve the magnetic properties during subsequent annealing.

The required intensity of the imposed room temperature magnetic field must, of course, be sufficient to approach magnetic saturation of the material being treated, or to exceed the knee of the curve obtained when the flux density of the magnetic material is plotted against the magnetizing force. For example, 10 oersteds are adequate for cold rolled Supermendur alloy which has been annealed at 1022° F. to effect high residual magnetization properties. However, it is preferred to employ a high magnetization field (exceeding 100 oersteds) when processing as-cold-rolled material so as to obtain the high $B_r$ or remanence.

As started above, soft magnetic materials that are susceptible to magnetic annealing are well known in the art as being certain binary and tertiary alloys of the iron-nickel-cobalt system plus electrical grades of silicon steel that contain from about 2% to 6% silicon. The known materials that will respond to applicants' treatment are those materials that are known to respond to ordinary magnetic annealing, and these materials are largely shown diagrammatically by the triaxial diagram of FIG. 3 (reproduced from "Magnetic Properties of Metals and Alloys," published by the American Society for Metals, Cleveland, Ohio). The shaded areas show all the materials known to respond to magnetic annealing except the silicon iron alloys mentioned above, and therefore show all the alloys known to respond to applicants' treatment, with the exception of silicon iron containing 2–6% by weight silicon. The dark shadings are compositions which show the effect very strongly. All of these alloys may, of course, contain small additions of alloying materials usually present to affect properties other than magnetic properties. For example, Supermendur alloy contains up to 2.5% V.

The heat treatment of the present invention is the same heat treatment employed during magnetic annealing. These temperatures must, of course, be below the Curie temperature (preferably at least 2° F. below the Curie temperature) of the alloy being treated, since to equal or exceed the curie temperature will erase the effects of any magnetic field present. However, for the material to benefit from the effects of the residual magnetism, the temperature should be within about 300° F. of the Curie temperature. Consequently, an acceptable range of heat treatment for all the materials susceptible to magnetic annealing as shown by FIG. 3 is from slightly below the Curie temperature to 300° F. below the Curie temperature.

The optimum time at temperature depends, of course, on the exact analyses of the material being treated, the gauge, etc. A time as short as one-half hour may be sufficient, while times of from about 2 to 6 hours are usual.

To secure a material of high $B_r$ and high $H_c$ such as is shown by FIG. 2 for the Fe, Co, V composition which, as shown, is particularly susceptible to the treatment of the present invention, it is necessary to heat treat the as-cold-rolled material at a temperature wherein some recovery occurs but recrystallization does not occur so that the material will exhibit a high energy rectangular hysteresis loop upon subsequent magnetization. As shown, an ideal temperature to accomplish this for the 49% Fe, 49% Co, 2% V composition is about 1022° F.

The following specific examples are given to illustrate the method of the present invention, and in no way limit the claims to the specific embodiments set forth. .014" punched ring samples were subjected to direct current tests in various conditions of heat treatment, typifying both the prior art practice and the practice of the present invention. The data shown by Tables I through IV are illustrative of prior art practices:

TABLE I

*Annealed at 1385° F. for 2 Hours in Pure Dry Hydrogen and Fast Cooled by Withdrawing the Annealing Box From the Furnace (.014" Stamped Rings)*

| Heat | D.C. | | | | |
|---|---|---|---|---|---|
| | B at 10H, Gausses | B at 100H Gausses | $B_r$ from 100H, Gausses | $H_c$ from 100H, Oersteds | $\mu$ Max. |
| 23,152 | 20,600 | 22,900 | 14,700 | 1.29 | 7,000 |
| 23,153 | 20,800 | 23,000 | 13,000 | 1.18 | 7,650 |
| 23,154 | 20,500 | 23,000 | 12,800 | 1.01 | 6,900 |

TABLE II

*Annealed at 1550° F. for 4 Hours and Fast Cooled by Withdrawing the Box From the Furnace*

| Heat | D.C. | | | | | |
|---|---|---|---|---|---|---|
| | B at 10H, Gausses | B at 100H, Gausses | $B_r$ from 100H, Gausses | $H_c$ from 100H, Oersteds | $\mu$ Max. | $B_r/B_m$ 100H |
| 23,152 | 21,100 | 23,000 | 7,000 | .61 | 9,090 | .30 |
| 23,153 | 20,950 | 23,100 | 6,400 | .61 | 8,940 | .28 |
| 23,154 | 21,000 | 23,100 | 6,900 | .58 | 9,200 | .30 |

TABLE III

*Annealed at 1550° F. for 4 Hours, Furnace Cooled to 1100° F., and Withdrawn*

| Heat | D.C. | | | | | |
|---|---|---|---|---|---|---|
| | B at 10H, Gausses | B at 100H, Gausses | $B_r$ from 100H, Gausses | $H_c$ from 100H, Oersteds | $\mu$ Max. | $B_r/B_m$ 100H |
| 23,154 | 20,800 | 23,000 | 9,700 | .45 | ----- | .42 |

TABLE IV

*Annealed at 1550° F. for 4 Hours in P.D. $H_2$ in the Presence of an Externally Applied Circumferential Magnetic Field of 5 to 10 Oersteds, Furnace Cooled to 1100° F. in the Presence of the Field, Withdrawn and Cooled to Room Temperature in the Presence of the Magnetic Field*

| Heat | D.C. | | | | | |
|---|---|---|---|---|---|---|
| | B at 10H, Gausses | B at 100H, Gausses | $B_r$ from 100H, Gausses | $H_c$ from 100H, Oersteds | $\mu$ Max. | $B_r/B_m$ 100H |
| 23,152 | 21,800 | 23,100 | 18,700 | .205 | 45,000 | .81 |
| 23,154 | 21,400 | 23,000 | 19,400 | .192 | 60,000 | .85 |

TABLE V

*Annealed at 1022° F. for 4 Hours in Pure Dry Hydrogen and Withdrawn From the Furnace (.014" Stamped Rings)*

| Heat | D.C. | | | | | |
|---|---|---|---|---|---|---|
| | B at 10H, Gausses | B at 100H, Gausses | $B_r$ from 100H, Gausses | $H_c$ from 100H, Oersteds | $\mu$ Max. | $B_r/B_m$ 100H |
| 23,152 | 1,650 | 21,400 | 18,100 | 20.6 | 735 | .845 |
| 23,153 | 1,700 | 21,400 | 17,900 | 20.1 | 717 | .837 |
| 23,154 | 1,650 | 21,300 | 17,900 | 20.2 | 726 | .837 |

TABLE VI

*.014 Ring Samples Annealed at 1550° F. and Cooled as Indicated Samples Magnetized and Left at Remanence Prior to Annealing*

| Heat | Treatment | B at 10H, Gausses | B at 100H, Gausses | $B_r$ from 100H, Gausses | $H_c$ from 100H, Oersteds | $B_r/B_m$ | $\mu$ Max. |
|---|---|---|---|---|---|---|---|
| 23,152 | Reannealed [1] (fast cooled). | 21,100 | 23,000 | 12,600 | .412 | .55 | 24,400 |
| 23,152 | Not Previously Annealed (fast cooled). | 21,050 | 23,100 | 8,600 | .460 | .37 | 10,300 |
| 23,154 | Reannealed [1] (furnace cooled to 1100° F.). | 20,700 | 23,100 | 14,500 | .276 | .63 | 34,900 |
| 23,154 | Not Previously Annealed (furnace cooled to 1100° F.). | 20,800 | 23,000 | 9,700 | .452 | .42 | 10,800 |

[1] Annealed previously at 1022° F.

It may be observed from the data of Table I and from the diagrammatic representation of Table I as represented by the hysteresis loop A illustrated by FIG. 1, the induction (B), in gausses, at a magnetizing force of 10H and 100H, in oersteds, is reasonably high for rings annealed at 1385° F. and fast cooled. Also, the residual induction ($B_r$) from 100H is relatively high; however, the coercive force ($H_c$) is undesirably high and the maximum permeability ($\mu$) is relatively low. The shape of the hysteresis loop is not particularly desirable since it cannot be said to be rectangular, and the coercive force (averageing 1.14) is high.

It is shown by Table II that heating at a higher temperature (1550° F.) for a longer period of time effects substantially the same induction at high fields as the 1385° F. treatment. However, the higher temperature and longer time anneal advantageously lower the coercive force, but also lower the residual induction ($B_r$) which, as stated above, are undesirable. Also, as illustrated, the ratio of the residual induction ($B_r$) to the maximum induction ($B_m$) at 100H is low.

The advantages of magnetic annealing are demonstrated by the data shown by Table IV and as illustrated by loop C of FIG. 1. The induction levels at 10H and 100H remain substantially the same while the residual induction has doubled over the similarly annealed material shown by Table III, and the coercive force is less than half that shown by the previous data. As shown by loop C of FIG. 1 and the $B_r/B_m$ ratio, the hysteresis loop is nearly rectangular.

The data shown in Tables V through VIII clearly show the advantages obtained by employing the method of the present invention.

mum is very low. The real significance of this data is the high residual induction and very high coercive force. Such a loop and its accompanying $H_c$ demonstrate the properties of a relatively hard or permanent magnetic material. It is the residual induction that provides the magnetic force that the applicants have found to be an adequate substitute for the magnetic field generally externally applied during magnetic annealing.

The data shown by Table VI show several samples that have been treated substantially in accordance with the method of the present invention (examples labeled reannealed). These samples were among those tested in the manner shown by Table V (subject to a magnetic field during the measurement of magnetic properties) and then re-annealed and tested, the results of which are shown by Table VI and loop D of FIG. 1. Since the rings possessed considerable residual magnetism when heated to temperatures below the Curie temperature but above 1500° F., they, in effect, created their own magnetic field for magnetic annealing. The data show $B_r$

TABLE VII

*.014" Ring Samples as Cold Rolled Plus 1550° F. Anneal and Slow Cool to 1100° F.*

| Heat | As Cold Rolled | |
|---|---|---|
| | B at 1077H, Gausses | μ Max. |
| 23,152 | 23,500 | 80 |
| 23,153 | 23,500 | 85 |
| 23,154 | 23,500 | 85 |

*.014" Ring Samples as Cold Rolled Plus 1550° F. Anneal and Slow Cool to 1100° F.*

ANNEALED

| Heat | B at 10H, Gausses | $B_r$, Gausses | $H_c$, Oersteds | $B_r$/B10 | B at 50H, Gausses | $B_r$, Gausses | $H_c$, Oersteds | $B_r$/B50 | B at 100H, Gausses | $B_r$, Gausses | $H_c$, Oersteds | $B_r$/B100 | μ Max. |
|---|---|---|---|---|---|---|---|---|---|---|---|---|---|
| 23,152 | 21,100 | 14,000 | .38 | .692 | 22,800 | 14,500 | .38 | .64 | 23,000 | 14,400 | .38 | .63 | 31,200 |
| 23,153 | 20,700 | 15,100 | .36 | .729 | 22,600 | 15,000 | .36 | .67 | 22,900 | 15,300 | .37 | .67 | 33,500 |
| 23,154 | 20,900 | 14,100 | .39 | .675 | 22,700 | 14,200 | .39 | .63 | 23,000 | 14,200 | .39 | .62 | 32,800 |

TABLE VIII

*.014" Ring Samples Annealed at 1022° F., Tested and Left at $B_r$, Reannealed at 1550° F. and Slow Cooled to 1100° F., Retested*

AFTER 1022° F. ANNEAL

| Heat | B at 100H, Gausses | $B_r$ from 100H, Gausses | $H_c$ from 100H, Oersteds | $B_r/B_m$ |
|---|---|---|---|---|
| 23,152 | 21,300 | 18,000 | 20.8 | .85 |
| 23,153 | 21,300 | 17,800 | 20.4 | .84 |
| 23,154 | 21,200 | 17,700 | 20.7 | .84 |

MAGNETIZED+1550° F. ANNEAL

| Heat | B at 10H, Gausses | $B_r$, Gausses | $H_c$, Oersteds | $B_r$/B10 | B at 50H, Gausses | $B_r$, Gausses | $H_c$, Oersteds | $B_r$/B50 | B at 100H, Gausses | $B_r$, Gausses | $H_c$, Oersteds | $B_r$/B100 | μ Max. |
|---|---|---|---|---|---|---|---|---|---|---|---|---|---|
| 23,152 | 20,900 | 14,200 | .37 | .68 | 22,600 | 14,200 | .37 | .63 | 22,900 | 14,200 | .37 | .62 | 30,000 |
| 23,153 | 20,700 | 15,500 | .36. | .75 | 22,600 | 15,500 | .37 | .63 | 22,900 | 15,500 | .37 | .68 | 40,000 |
| 23,154 | 20,500 | 14,100 | .31 | .69 | 22,500 | 14,100 | .32 | .63 | 22,800 | 14,200 | .32 | .62 | 36,900 |

The data shown by Table V, and as illustrated by the hysteresis loop shown by FIG. 2, illustrates the effect of a low temperature anneal (1022° F. for four hours). Although, as shown by FIG. 2 and the $B_r/B_m$, the hysteresis loop is very rectangular, the permeability maxiproperties that are significantly higher than the samples similarly heated, but not subjected to the prior 1022° F. anneal or a magnetic remanence (examples entitled "Not Previously Annealed"). The $B_r/B_m$ at 100H, and hence the shape of the hysteresis loop, does not indicate a loop that is perfectly rectangular; however, the shape of the loop is superior to any of the prior treated material except that actually magnetically annealed. Additionally, the increase in residual induction at 100H and the permeability maximum more than make up for the loss in rectangularity over the properties shown by the data of any of the previously treated samples, with the exception of that shown by Table IV.

The data shown by Table VII show the magnetic properties of ring samples that were subjected to a magnetic field of approximately 1077H in the cold rolled, room temperature condition. After annealing (1550° F.) and slow-cooling, magnetic properties were measured at 10H, 50H and 100H. As may be observed, the coercive force is low, the residual magnetism and permeability are high and the hysteresis loop is reasonably rectangular in shape.

The data shown by Table VIII show the magnetic properties of additional ring samples annealed at 1022° F. to effect properties similar to those shown by the examples of Table V. At the conclusion of testing at 100H, the samples were left at remanence, annealed at 1550° F. for four hours and slow-cooled. The magnetic properties at 10H, 50H and 100H are shown to be substantially similar to those shown by Table IV and equivalent to those of Tables VI and VII.

We claim:

1. The method for improving the magnetic characteristics of direct current hysteresis loop rectangularity, high permeability and low coercive force in magnetically soft materials selected from the group consisting of metals having substantially a composition which falls within the shaded areas of the triaxial diagram of the accompanying FIG. 3 and 2% to 6% silicon in iron alloys, the steps comprising, subjecting the magnetically soft material to a magnetic field having an intensity within the range between that sufficiently great to exceed the knee of the hysteresis loop of the material being treated and that sufficient to achieve magnetic saturation, removing the magnetic field to leave said material at remanence, and thereafter annealing said material free of said magnetic field at a temperature within the range from about 300° F. below the Curie temperature of said material to within 2° F. of the Curie temperature of said material.

2. The method for improving the magnetic characteristics of direct current hysteresis loop rectangularity, high permeability and low coercive force in magnetically soft materials selected from the group consisting of metals having substantially a composition which falls within the shaded areas of the triaxial diagram of the accompanying FIG. 3 and 2% to 6% silicon in iron alloys, the steps comprising, subjecting the magnetically soft material to a magnetic field having an intensity within the range between that sufficient to exceed the knee of the hysteresis loop of the material being treated and that sufficient to achieve magnetic saturation, removing the magnetic field to leave said material at remanence, and thereafter annealing said material free of said magnetic field at a temperature within the range from about 300° F. below the Curie temperature of said material to within 2° F. of the Curie temperature of said material, for a time period ranging between ½ and 6 hours.

3. The method for improving the magnetic characteristics of direct current hysteresis loop rectangularity, high permeability and low coercive force in magnetically soft materials selected from the group consisting of metals having substantially a composition which falls within the shaded areas of the triaxial diagram of the accompanying FIG. 3 and 2% to 6% silicon in iron alloys and which have been cold rolled, the steps comprising, heat treating the cold rolled material at a temperature below the recrystallization temperature to effect magnetic recovery, cooling the steel to room temperature, subjecting the magnetically soft material to a magnetic field having an intensity within the range between that sufficient to exceed the knee of the hysteresis loop of the material being treated and that sufficient to achieve magnetic saturation, removing the magnetic field to leave said material at remanence, and thereafter annealing said material free of said magnetic field at a temperature within the range from about 300° F. below the Curie temperature of said material to within 2° F. of the Curie temperature of said material.

4. The method for improving the magnetic characteristics of direct current hysteresis loop rectangularity, high permeability and low coercive force in magnetically soft materials selected from the group consisting of metals having substantially a composition which falls within the shaded areas of the triaxial diagram of the accompanying FIG. 3 and 2% to 6% silicon in iron alloys and which have been cold rolled, the steps comprising, heat treating the cold rolled material at a temperature below the recrystallization temperature to effect magnetic recovery, cooling the steel to room temperature, subjecting the magnetically soft material to a magnetic field having an intensity within the range between that sufficient to exceed the knee of the hysteresis loop of the material being treated and that sufficient to achieve magnetic saturation, removing the magnetic field to leave said material at remanence, and thereafter annealing said material free of said magnetic field and having said residual magnetism at a temperature within the range from about 300° F. below the Curie temperature of said material to within 2° F. of the Curie temperature of said material for a time period ranging between ½ hour and 6 hours.

5. The process of effecting direct current hysteresis loop rectangularity, high permeability and low coercive force properties in cold worked metal the composition of which falls within the shaded areas of the triaxial diagram of FIG. 3 and 2% to 6% silicon in iron alloys which comprises the steps of, subjecting the cold worked metal to an induced magnetic field at substantially room temperature wherein the magnetizing force exceeds 100 oersteds, removing said magnetic field leaving said strip at remanence so as to effect a residual magnetism, and annealing said strip at a temperature of from about 300° F. below the Curie temperature of said metal up to just below the Curie temperature of said metal for a time of at least ½ hour.

6. The process of effecting direct current hysteresis loop rectangularity, high permeability and low coercive force properties in flat rolled 49% Fe, 49% Co, 2% V magnetic material which comprises the steps of, subjecting said material to a magnetic field having an intensity within the range between that sufficient to exceed the knee of the hysteresis loop of the material being treated and that sufficient to achieve magnetic saturation at substantially room temperature, removing the magnetic field leaving said material at remanence so as to effect a residual magnetism, and thereafter annealing said material free of said magnetic field at a temperature within the range of from about 1450° F. to 1600° F. for a period of from about 2 to 6 hours.

7. The process of effecting direct current hysteresis loop rectangularity, high permeability and low coercive force properties in flat rolled 49% Fe, 49% Co, 2% V magnetic material which comprises the steps of, heat treating said alloy at a temperature of about 1022° F. so as to effect the magnetic properties of high residual induction and high coercive force, subjecting said material to a magnetic field having an intensity within the range between that sufficient to exceed the knee of the hysteresis loop of the material being treated and that sufficient to achieve magnetic saturation at substantially room temperature, removing the magnetic field leaving said material at remanence so as to effect a residual magnetism, and thereafter annealing said material within the range of from about 1450° F. to 1600° F. for a period of from about 2 to 6 hours.

(References on following page)

References Cited in the file of this patent

UNITED STATES PATENTS

| | | |
|---|---|---|
| 2,519,277 | Nesbitt et al. | Aug. 15, 1950 |
| 2,534,178 | Marquaire | Dec. 12, 1950 |
| 3,024,142 | Parkin | Mar. 6, 1962 |

FOREIGN PATENTS

| | | |
|---|---|---|
| 852,249 | Great Britain | Oct. 26, 1960 |

OTHER REFERENCES

Metal Progress, January 1952, pages 106–107.